(12) United States Patent
Gadamsetty

(10) Patent No.: US 9,965,541 B2
(45) Date of Patent: May 8, 2018

(54) INTEREST GROUPS BASED ON NETWORK FEED ITEMS

(71) Applicant: salesforce.com, inc., San Francisco, CA (US)

(72) Inventor: Ashok Gadamsetty, Prakasam (IN)

(73) Assignee: salesforce.com, inc., San Francisco, CA (US)

( * ) Notice: Subject to any disclaimer, the term of this patent is extended or adjusted under 35 U.S.C. 154(b) by 534 days.

(21) Appl. No.: 14/629,850

(22) Filed: Feb. 24, 2015

(65) Prior Publication Data

US 2016/0246869 A1    Aug. 25, 2016

(51) Int. Cl.
*G06F 17/30* (2006.01)
*H04L 12/58* (2006.01)
*H04L 29/08* (2006.01)

(52) U.S. Cl.
CPC .. *G06F 17/30598* (2013.01); *G06F 17/30289* (2013.01); *G06F 17/30525* (2013.01); *H04L 51/32* (2013.01); *H04L 67/12* (2013.01); *H04L 67/306* (2013.01)

(58) Field of Classification Search
CPC .................................................. G06F 17/30598
USPC .......................................................... 715/753
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

StakOverFlow, "Implementing Comments and Likes in Database" discussion thread posted at <https://stackoverflow.com/questions/8112831/implementing-comments-and-likes-in-database>, Published on Nov. 2011, 5 pages.*

(Continued)

*Primary Examiner* — Reza Nabi
(74) *Attorney, Agent, or Firm* — Weaver Austin Villeneuve & Sampson LLP

(57) ABSTRACT

Disclosed are some examples of systems, apparatus, methods and storage media for creating groups in a social networking database system, and more specifically, to creating groups based on network feed items. In some implementations, a database system is capable of maintaining a database including data associated with a plurality of users and groups to which the users can be subscribed. The system is configurable to provide a feed for display to a first user, and to receive input entered in a publication field by the first user. The system is configurable to create a feed item for display to the first user and to at least one second user based on the received input. The system is configurable to receive second input associated with the feed item from the second user. The system is additionally configurable to provide a selectable user interface (UI) element for display to the first user. Responsive to the selection of the UI element, the system is further configurable to create a new group based on the feed item, and to subscribe the first and the second user to the new group without additional input.

23 Claims, 11 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,047,030 B2* | 5/2006 | Forsyth ............... H04L 12/1822 455/416 |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,669,123 B2* | 2/2010 | Zuckerberg ........ G06F 17/30867 715/273 |
| 7,698,160 B2 | 4/2010 | Beaven et al. |
| 7,730,478 B2* | 6/2010 | Weissman ............ G06F 21/6218 717/100 |
| 7,747,648 B1 | 6/2010 | Kraft et al. |
| 7,779,039 B2* | 8/2010 | Weissman .......... G06F 17/30595 707/793 |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2* | 8/2011 | Cheah ................... G06Q 10/06 709/202 |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,185,558 B1 | 5/2012 | Narayanan et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,401,009 B1* | 3/2013 | Dorsey ................. H04L 51/066 370/389 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,380 B2* | 8/2013 | Faller ................... H04L 65/403 709/204 |
| 8,510,664 B2* | 8/2013 | Rueben ................. G06Q 10/00 709/206 |
| 8,566,301 B2 | 10/2013 | Rueben et al. |
| 8,646,103 B2 | 2/2014 | Jakobson et al. |
| 8,880,600 B2* | 11/2014 | Lento .................... G06Q 10/10 455/435.1 |
| 9,037,653 B2* | 5/2015 | Wiseman .............. H04W 4/02 709/205 |
| 9,148,397 B2* | 9/2015 | Talwar .................. H04L 51/38 |
| 9,177,347 B2* | 11/2015 | Jackson ................ G06Q 50/01 |
| 9,317,869 B2 | 4/2016 | Garcia-Martinez ........... G06Q 30/0251 |
| 9,361,322 B1* | 6/2016 | Dutta .................... G06Q 30/08 |
| 9,400,840 B2 | 7/2016 | Palmert |
| 9,412,136 B2* | 8/2016 | Gertzfield ............ G06Q 50/01 |
| 9,450,993 B2* | 9/2016 | Lento .................... G06Q 10/10 |
| 9,483,526 B2 | 11/2016 | Nahm |
| 9,613,153 B2* | 4/2017 | Beaufrere ........ G06F 17/30876 |
| 9,674,291 B2* | 6/2017 | Li ............................ H04L 67/26 |
| 9,686,337 B2* | 6/2017 | Garcia .................. H04L 65/601 |
| 9,697,466 B2* | 7/2017 | Clark .................... G06N 5/022 |
| 9,723,373 B2* | 8/2017 | Bruich .................. H04N 21/8133 |
| 9,729,494 B2* | 8/2017 | Ju .......................... H04L 51/32 |
| 9,729,555 B2* | 8/2017 | Ferguson .............. H04L 63/104 |
| 2001/0044791 A1 | 11/2001 | Richter et al. |
| 2002/0072951 A1 | 6/2002 | Lee et al. |
| 2002/0082892 A1* | 6/2002 | Raffel .................... G06Q 10/063 705/7.26 |
| 2002/0129352 A1 | 9/2002 | Brodersen et al. |

(56) References Cited

U.S. PATENT DOCUMENTS

| | | |
|---|---|---|
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0240856 A1* | 10/2006 | Counts .................... H04W 4/08 455/518 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0125632 A1* | 5/2010 | Leonard ................ G06Q 10/10 709/204 |
| 2010/0180232 A1* | 7/2010 | Honan .................... G06Q 30/02 715/811 |
| 2011/0196923 A1* | 8/2011 | Marcucci .............. G06Q 10/10 709/204 |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0323909 A1* | 12/2012 | Behforooz ............. G06Q 50/01 707/728 |
| 2013/0066993 A1* | 3/2013 | Granito ................ G06Q 10/107 709/206 |
| 2013/0179502 A1* | 7/2013 | Faller .................... H04L 65/403 709/204 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0033074 A1* | 1/2014 | Thibaux ............ G06F 17/30867 715/753 |
| 2014/0067945 A1* | 3/2014 | Archibong .......... H04L 65/4084 709/204 |
| 2014/0067946 A1* | 3/2014 | Bruich ................ H04L 65/4084 709/204 |
| 2014/0108547 A1* | 4/2014 | Rao ........................ H04L 51/32 709/204 |
| 2014/0108562 A1* | 4/2014 | Panzer .................. G06Q 10/10 709/206 |
| 2014/0172855 A1* | 6/2014 | Arnoux ............ G06F 17/30598 707/737 |
| 2014/0172857 A1* | 6/2014 | Powell ............. G06F 17/30702 707/738 |
| 2014/0207900 A1* | 7/2014 | Liu .................... G06Q 30/0246 709/216 |
| 2014/0208234 A1* | 7/2014 | Amit ..................... G06Q 50/01 715/753 |
| 2014/0222583 A1* | 8/2014 | Bullock ............. G06Q 30/0269 705/14.66 |
| 2014/0317732 A1* | 10/2014 | Beaufrere ........... H04L 63/1441 726/22 |
| 2014/0359537 A1 | 12/2014 | Jakobson et al. |
| 2015/0006289 A1 | 1/2015 | Jakobson et al. |
| 2015/0007050 A1* | 1/2015 | Jakobson ................ H04L 51/16 715/752 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0356570 A1* | 12/2015 | Goldsmid .......... G06Q 30/0201 705/7.29 |
| 2016/0057154 A1* | 2/2016 | Ferguson .............. H04L 63/104 726/7 |
| 2016/0150072 A1* | 5/2016 | Rangarajan ........... H04W 4/003 455/574 |
| 2016/0196584 A1* | 7/2016 | Franklin ............. G06Q 30/0267 705/14.64 |
| 2016/0246869 A1* | 8/2016 | Gadamsetty ...... G06F 17/30598 |
| 2016/0292217 A1* | 10/2016 | Sinha .................... G06F 3/0482 |
| 2016/0294836 A1* | 10/2016 | Williams .............. H04L 63/102 |
| 2017/0147699 A1* | 5/2017 | Rubin ............... G06F 17/30867 |

OTHER PUBLICATIONS

U.S. Appl. No. 14/221,678, filed Mar. 21, 2014, Nahm, Stephen X.
U.S. Appl. No. 14/221,971, filed Mar. 21, 2014, Palmert, Joe.
"Google Plus Users", Google+Ripples, Oct. 31, 2011 [retrieved on Feb. 21, 2012 from Internet at http://www.googleplusers.com/google-ripples.html], 3 pages.

* cited by examiner

FIGURE 3

INTEREST GROUPS BASED ON NETWORK FEED ITEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

This patent document relates generally to creating groups in a social networking database system, and more specifically, to creating groups based on network feed items.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 shows an example of a web interface for a group page including a group feed for interacting with members of the group in an enterprise social network according to some implementations.

DETAILED DESCRIPTION

Figure 1A:
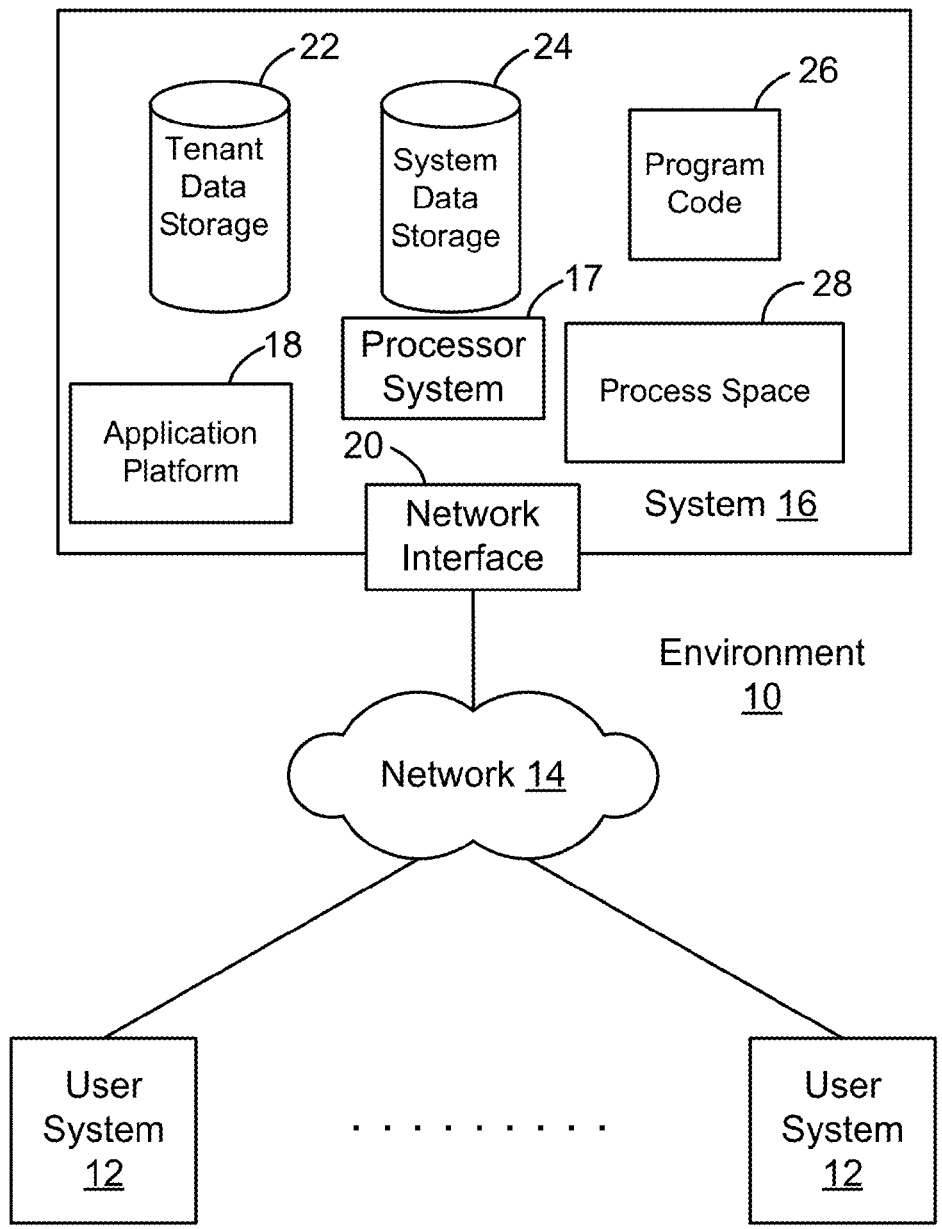
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; for example, the phrase "A, B or C" is intended to include the possibilities of "A," "B," "C," "A and B," "B and C," "A and C" and "A, B and C."

Some implementations described and referenced herein are directed to database systems, computer-implemented methods and computer-readable storage media for enterprise social networking, and more specifically, for creating an interest group based on a network feed item. Some implementations more specifically relate to creating an interest group based on published content in a feed item and based on interactions with the feed item by other users. When a user submits a publication to a network feed, such as a user feed, group feed or record feed, the publication is stored by the database system as a feed item. The publication can include user-entered textual content, and in some implementations, an associated file. After the publication is submitted to a feed, other users subscribing or having access to that feed may share the publication, comment on the publication, like the publication, or otherwise interact with or express an interest in the publication. In various implementations, the publishing user can create a dynamic interest group (also referred to herein more simply as an "interest group") pertaining to the feed item, and more specifically, to the content of the publication for which the feed item was created. For example, in some implementations the publishing user can create the interest group by clicking or otherwise selecting a graphical UI element such as a virtual button or link displayed within or in proximity to the feed item that contains the publication.

In some implementations, a database system automatically subscribes the publishing user and other interested users to the interest group. In some implementations, the database system identifies the interested users by determining which users commented on the publication or on other comments within the feed item, which users liked the publication or comments within the feed item, and which users shared the feed item to other feeds associated with other users, groups or records. In some implementations, the database system also identifies as interested users those users who have been referenced in the feed item or otherwise targeted to receive the corresponding publication. For example, the database system can identify as interested users those users who have been @-mentioned in the publication or in submitted comments within the feed item. The publishing user and the users who shared the publication, commented on the publication, liked the publication or who were referenced in the publication all can be characterized as having an interest in the publication, and as such, also are collectively referred to herein as "interested users."

Consider the following use case scenario. Suppose a user of a database system is encountering a problem (or "issue") with a tool. For example, the user can be a customer of, or an employee of an organization that is a customer of, the database system. The tool can be, for example, a cloud-based software tool provided by the database system over a network for use by the user at the user's computing device. One example of a cloud-based tool is a Java™-based tool. One example of a problem that can occur with a Java™-based tool is a Java™ configuration problem. As another example, the tool can be a non-cloud-based software tool stored in and executable by the user's computer device or by another computing device or system the user uses. As another example, the tool can be a hardware tool such as the user's computing device or other equipment or system used by the user.

Suppose that the user desires to seek help in solving the problem with the tool. In many instances, other users within the user's organization have encountered, are encountering, or will encounter the same or a similar problem as the user currently seeking help with the problem. In many scenarios, other users of the database system know a solution to the problem and can help the user solve the problem. These other users can include other users who have encountered the problem and have solved the problem, or other users that have encountered the problem and know of someone else who can solve the problem. The other users also can be specialized users responsible for solving such problems, such as technical support specialists within the user's organization or external to the organization (for example, employees or contractors of the organization that maintains the multi-tenant database system). However, often the user does not know the other users that can help with the problem or how to contact them. The user encountering the problem can post information about the problem to various groups the user subscribes to, for example, in the form of posts submitted to the groups' respective news feeds. But the other users in these groups may not know how to solve the problem or whom to contact to find help with the problem. The user encountering the problem can also send emails directly to other users or technical support specialists but, again, the user encountering the problem often does not know the email addresses of the other users who can solve the problem or find help with the problem.

In one example use case, a user encountering and seeking a solution to a problem submits a publication about the problem to the user's user feed, a group feed, a record feed or to multiple feeds. For example, the user may submit the publication about the problem to the user's own user feed as well as to one or more feeds corresponding to groups or records having subscribers that may have an interest in the problem or its solution. For example, the publishing user may submit the publication to a feed of a group of users who are already collaborating with the publishing user for various purposes.

In some instances, some of the users subscribed to the publishing user, or to the respective groups or records to which the publication was submitted, may be facing the same problem. In some instances, some of the users may have attempted to solve the problem, actually solved the problem (or a similar problem) or can identify someone else who can solve the problem. In some such scenarios, the other users viewing the feed item may submit comments to the publication or to other comments already made on the publication in the feed item including specific information about their attempts to solve the problem, the results (whether successful or unsuccessful) of such attempts, and solutions determined for the problem or similar problems.

In some implementations, the publishing user or one of other interested users that interacted with the feed item can create an interest group based on the feed item by selected a virtual button or link within or in proximity to the feed item. Upon selection of the virtual button or link, the database system creates an interest group based on the feed item and automatically subscribes the interested user who interacted with the feed item to the newly created interest group.

The subscribers can now collaborate on the problem using the new interest group dedicated to the problem. Additionally, other users who may be encountering, or who will encounter, the same or a similar problem also may find and view the interest group to find the solution to their own problem.

In some implementations, the customers, employees or other users described herein are users (or "members") of an interactive online "enterprise social network," also referred to herein as a "social networking system," an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif.

salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
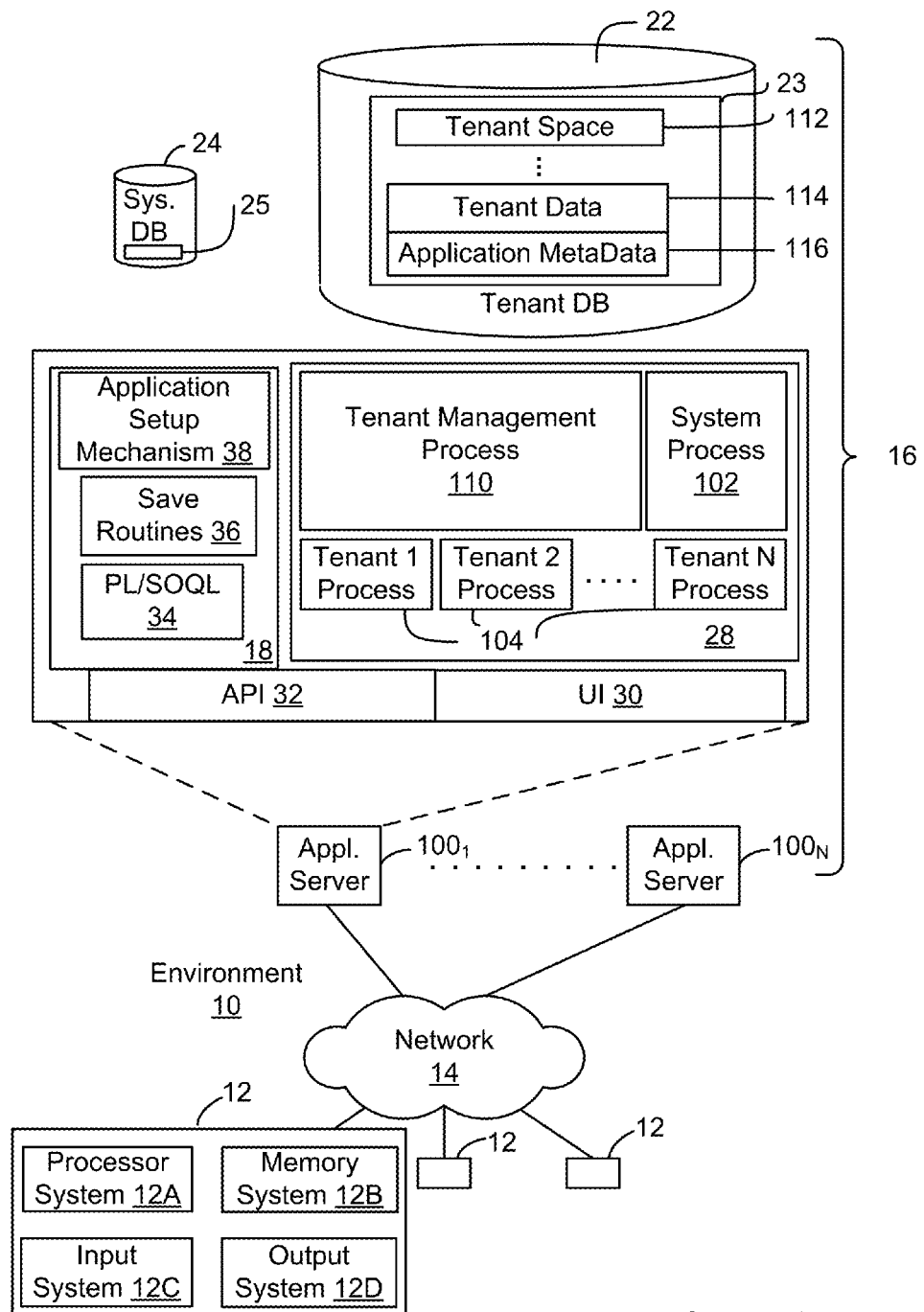
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application (or "app") servers $100_1$-$100_N$. Each of the application servers $100_1$-$100_N$ (also referred to collectively herein as "the application server 100") is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
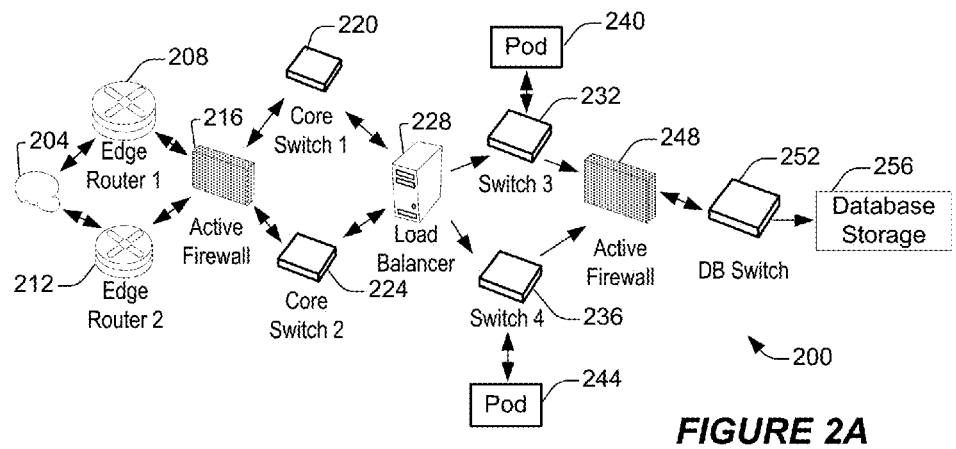
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
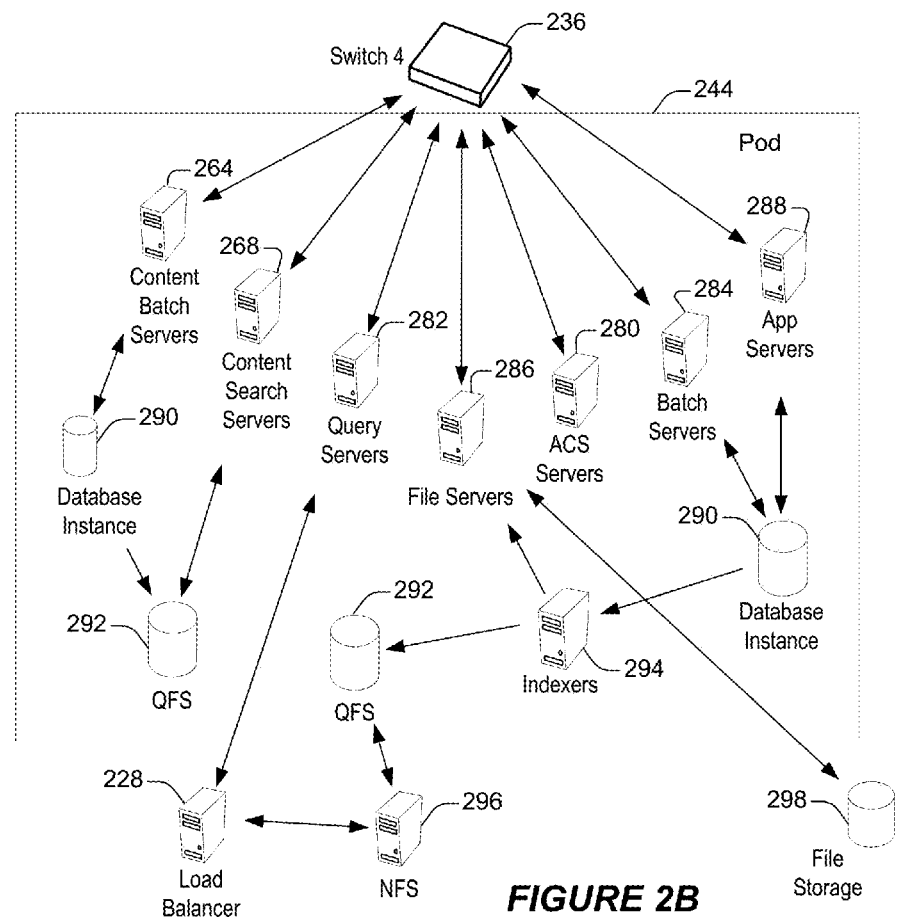
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Enterprise Social Networking

As described above, in some implementations the database system 16 includes application servers $100_1$-$100_N$ that can implement or host one or more applications or platforms for providing various on-demand or cloud-computing features or services described herein. In some implementations, one or more of the application servers $100_1$-$100_N$ implement or host an enterprise social networking platform. In some implementations, the enterprise social networking platform enables each tenant of the database system 16 to create, customize, build or access an enterprise social network for use by users of the respective organization (tenant).

Enterprise social networks can be implemented in various settings, including businesses, organizations and other enterprises (all of which are used interchangeably herein). For instance, an enterprise social network can be implemented to connect users within a business corporation, partnership or organization, or a group of users within such an enterprise. For instance, Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to database system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). The data associated with a user profile also can include various permissions defining the ability of the user to interact with various data objects. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

In some implementations, a "community" refers to a collection of one or more users within an organization that is a tenant of the database system 16 and one or more persons or enterprises outside of the organization that may or may not necessarily be tenants of the database system 16. For example, a community can enable users of an organization to connect with various partners outside of the organization including various third-party partners outside of the social networking system to facilitate one or more shared goals, objectives, or activities. For example, such partners can include distributors, resellers and suppliers, among other desirable partners. In some implementations, multiple communities can be created for or by an organization for different purposes and for connecting or collaborating with different partners. In some implementations, a community also can have a community feed.

A "record" generally refers to a data entity, such as an instance of a data object created by a user or a group of users of the database system 16. Such records can include, for example, data objects representing and maintaining data for accounts (for example, representing a business relationship with another enterprise). In some implementations, each record is assigned a record type, which can be identified by a RecordTypeID. Examples of account record types include: customers (for example, users or organizations who pay the enterprise money), customer support (for example, users or organizations who pay the enterprise money to support them), households (for example, organizations in a business-to-consumer model), partners (for example, organizations who pay the enterprise money and to whom the enterprise pays money), suppliers (for example, organizations to whom the enterprise pays money), and other organizations including organizations with whom no money is exchanged. Other examples of record types in addition to accounts can include cases, opportunities, leads, projects, contracts, orders, pricebooks, products, solutions, reports and forecasts, among other possibilities.

For example, an account record can be for a business partner or potential business partner, an actual or potential customer, an actual or potential supplier, an actual or potential distributor, or a client, among other possibilities. A record such as an account can include information describing an entire enterprise or subsidiary of an enterprise. As another example, a record such as an account record itself can include a number of records. For example, a customer account can include opportunities, contracts, and orders. As another example, a partner record can include a project or contract that a user or group of users is working on with an existing partner, or a project or contract that the user is trying to obtain with a partner. A record also can include various data fields and controls that are defined by the structure or layout of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in a graphical user interface (GUI) on a display device such as the display of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a graphical user interface (GUI), for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item (such as a feed-tracked update, post, or status update). In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

Figure 3:
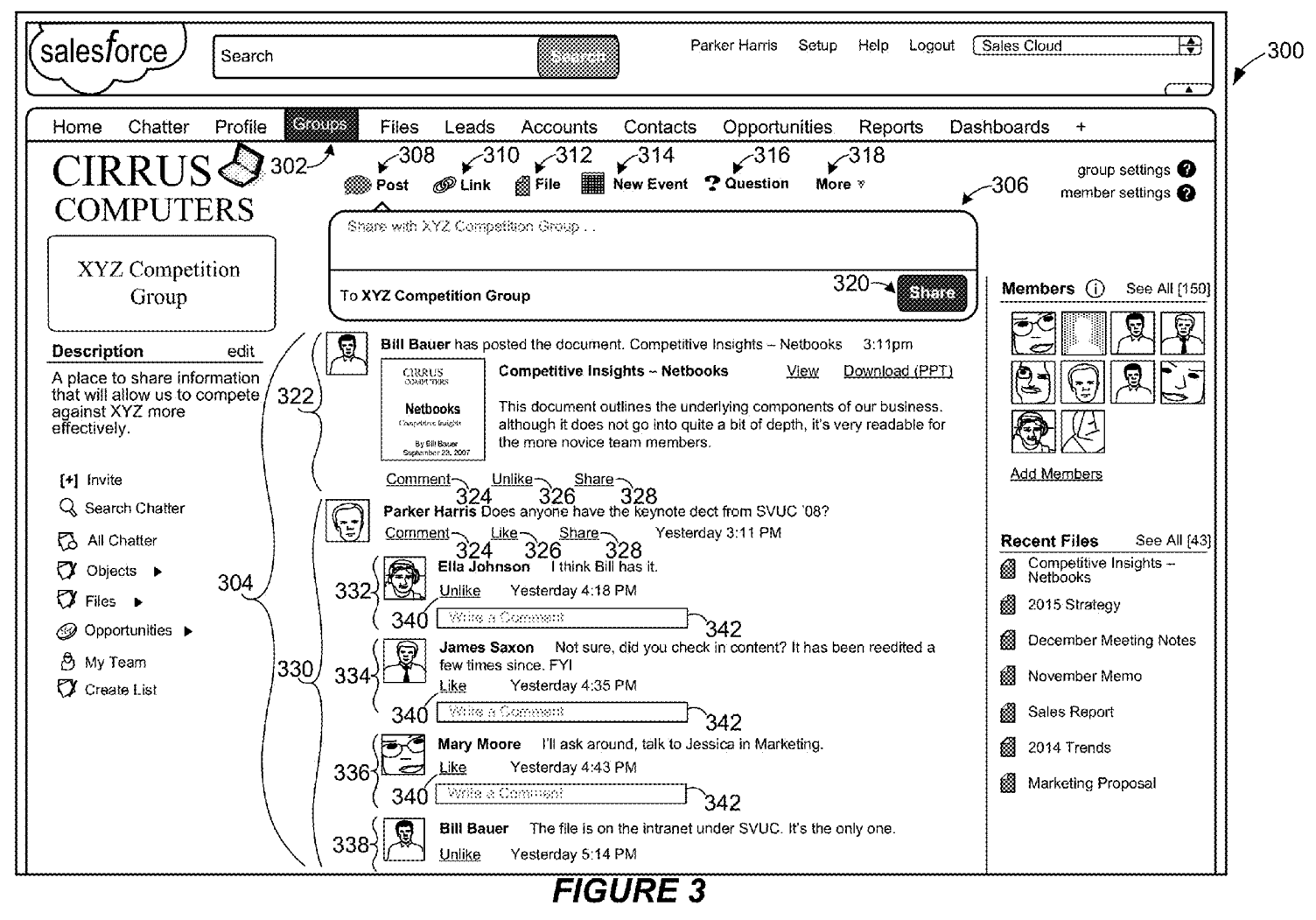

FIG. 3 shows an example of a web interface 300 for a group page including a group feed for interacting with members of the group in an enterprise social network according to some implementations. For example, the database system 16 can generate the interface 300 and transmit it to a user's computer (for example, as an HTML structured document) over one or more networks for rendering by a web browser or other rendering engine executing within the user's computer. The interface 300 can include multiple primary tabs for accessing various information or data. The primary tabs include a Groups tab 302 that, when "clicked" or otherwise selected by a user (as is the case in FIG. 3), opens a page displaying various information or UI elements for a group (or groups) in a section or area below the primary tabs.

The primary tabs of the interface 300 can be customizable by a user or by an administrator for the user's organization. For example, the primary tabs of the interface also can include a Home tab that opens the user's home page, a Chatter® tab that displays Chatter®-related information includes a personal news feed, a Profile tab that opens the user's profile page, a Files tab that opens a page displaying various information or UI elements associated with the file records the user owns or is subscribed to. Other primary tabs can include a Leads tab, an Accounts tab, an Opportunities tab, a Reports tab, a Dashboard tab, and a Contacts tab (in some implementations, the contacts are third-party contacts that are not registered users of the enterprise social network). Depending on which of the primary tabs described above is selected, the interface 300 can include one or more sub-tabs, buttons, links or other UI elements that can be selected to facilitate collaboration or the completion of a workflow.

As just described, the Groups tab 302 is selected in FIG. 3. In the illustrated example, the interface 300 displays a group page for the group "XYZ Competitive Group." The interface 300 includes a group feed 304 for the group in a section below the primary tabs. The interface 300 includes a publication window 306 at a top portion of the group feed 304 that enables the user to submit a publication to the group feed. In the illustrated example implementation, the user can select a format or context for the publication by selecting the "Post" sub-tab 308, the "Link" sub-tab 310, the "File" sub-tab 312, a "New Event" sub-tab 314 or the "Question" sub-tab 316 or a "More" sub-tab 318. The arrangement of the publication window 306 and the number and function of various UI elements displayed in the publication window 306 can be tailored to a specific type of publication depending on which of the sub-tabs is selected to facilitate the publication. For example, the Post sub-tab 308 (selected in the illustrated example) enables the user to enter content in the form of text in the publication window 306. The user can also elect to reference other users, groups or records by, for example, @-mentioning such users, groups or records. The user can submit (publish) the publication by selecting a "Share" button 320. As another example, the Link sub-tab 310 enables the user to publish a link such as a URL or other address to the feed (note that this instance of the term "link" is not to be used interchangeably with the terms "subscription," "association," or "following" or other derivations or conjugations of these terms as described above). As another example, the File sub-tab 312 enables a user to publish a file to the feed as well as to enter text describing the file or otherwise relating to the file. As another example, the New Event sub-tab 314 enables the user to share an event invitation or to describe an event. As another example, the Question sub-tab 316 enables a user to publish a question. In some implementations, a published question can be distinguished from a normal post by the manner the question is displayed in a feed item or by the manner in which other users are notified of its publication. Furthermore, the More sub-tab 320 can allow a user to perform or cause other actions. For example, upon a user selecting the More sub-tab 320, a drop-down menu or pick list can be displayed below providing the user with selectable options or actions the user can choose.

As shown, the group feed 304 includes feed items published by other users. For example, the group feed 304 includes a first feed item 322 that includes a file and a related description published by the user "Bill Bauer." As shown, the user viewing the group feed 304 can select to comment on the publication, like the publication or share the publication via Comment, Like and Share buttons or links 324, 326, and 328, respectively. For example, when the user selects the Comment link 324, a comment window can be displayed in the feed item 322 in an area below the original publication. In some implementations, after the user viewing the group feed 304 has selected to "like" the publication via the Like link 326, the Like link can be transformed to an "Unlike" link enabling the user to unlike the publication. In some implementations, after a user selects the Share link 328, a pop-up window can be displayed enabling the user to select other users, groups or records for which to share the feed item 322. Also shown in the group feed is a second feed item 330 that includes a post published by the user "Parker Harris." As shown, other users, including Ella Johnson, James Saxon, Mary Moore and Bill Bauer have submitted comments 332, 334, 336 and 338, respectively, on the publication submitted by Parker Harris. In some implementations, the user viewing the group feed 304 can like the individual comments via Like links 340 or comment on individual comments via comment fields 342.

Figure 4:
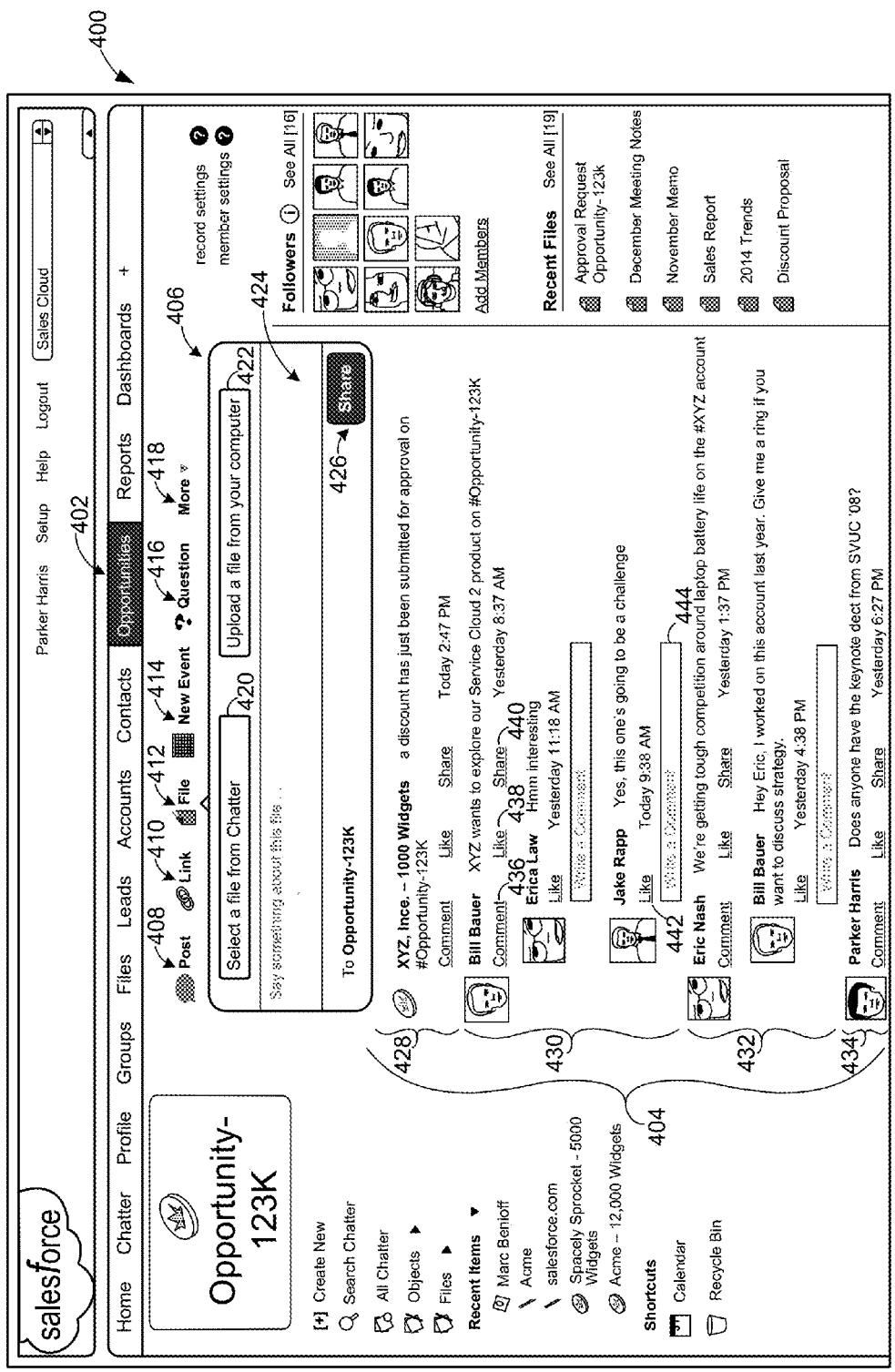
FIG. 4 shows an example of a web interface for a record page including a record feed for interacting with followers of the record in an enterprise social network according to some implementations.

FIG. 4 shows an example of a web interface 400 for a record page including a record feed for interacting with followers of the record in an enterprise social network according to some implementations. The Opportunities tab 402 is selected in FIG. 4. In the illustrated example, the interface 400 displays an opportunity page (a type of record page) for the opportunity "Opportunity-123K." The interface 400 includes a record feed 404 for the opportunity in a section below the primary tabs. The interface 400 includes a publication window 406 at a top portion of the record feed 404 that enables the user to submit a publication to the record feed. In the illustrated example implementation, the user can select a format or context for the publication by selecting a Post sub-tab 408, a Link sub-tab 410, a File sub-tab 412, a New Event sub-tab 414, a Question sub-tab 416 or a More sub-tab 418. As described above with reference to the group feed 404 of FIG. 4, the arrangement of the publication window 406 and the number and function of various UI elements displayed in the publication window 406 can be tailored to a specific type of publication depending on which of the sub-tabs is selected to facilitate the publication. In the illustrated example, the File sub-tab 412 is selected. The user can select a file to include in the publication via elements 420 or 422. The user also can add a description of the file or other information about the file in a body field 424. The user can also elect to reference other users, groups or records by, for example, @-mentioning such users, groups or records. The user can submit (publish) the publication by selecting a "Share" button 426.

As shown, the record feed 404 includes feed items published by other users. For example, the record feed 404 includes a number of feed items 428, 430, 432 and 434. Similar to the group feed 304 shown and described with reference to FIG. 3, the user viewing the record feed 404 can select to comment on the publications, like the publications or share the publications via Comment, Like and Share buttons or links 436, 438, and 440, respectively. As also described above, the user viewing the record feed 404 can like the individual comments via Like links 442 or comment on individual comments via comment fields 444.

III. Enterprise Social Networking Architecture

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some such implementations, each row of the Users Table represents a unique user. Each row can include an OrgID in a first column, a user identifier UserID in a second column, and various information about the user in one or more additional columns. For example, a third column can include an identification of a user type (for example, a standard user or a portal user), a fourth column can include the user's actual name or screen name, a fifth column can include the user's email address, and a sixth column can include a password. In some alternative implementations, these or additional columns can include other information about or pertaining to the users.

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some such implementations, each row of the Groups Table represents a unique group. Each row can include an OrgID in a first column, a GroupID in a second column, and various information about the group in one or more additional columns. For example, a third column can include a group type (for example, an identification of whether the group is public or private), a fourth column can include a name or title of the group, a fifth column can include a UserID associated with the owner of the group (for example, the user that created the group), a sixth column can include information about the group (for example, a short description of a membership characteristic such as a purpose, objective or other relating quality of the members), and a seventh column can include a description of the group (for example, a longer description of the group's purpose or objective and membership characteristics). In some implementations, the information or description can include clickable or otherwise selectable textual or other user interface (UI) elements (for example, hyperlinks) that direct the user to the respective page associated with the selected element. In some alternative implementations, these or additional columns can include other information about or pertaining to the groups.

In some implementations, communities are stored as specialized groups within the Groups Table. In some other implementations, communities are stored in a separate Communities Table and have unique CommunityIDs.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some such implementations, each row of the Group-User Table represents a defined relationship, association, link or subscription (all of which are used interchangeably herein where appropriate) between a particular group and users subscribed to the group. Each row can include an OrgID in a first column, a GroupID in a second column, and at least one UserID in one or more third columns. Thus, each row defines a subscription relationship in which a user identified by a UserID in the third column is subscribed to the group identified by the GroupID in the second column, and in which the group identified by the GroupID in the second column is within the organization identified by the OrgID in the first column of the same row. In some alternative implementations, additional columns can include other information about or pertaining to the subscriptions between the users and groups.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some such implementations, each row of the Records Table represents a unique record. Each row can include an OrgID in a first column, a RecordID in a second column, and various information about the record in one or more additional columns. For example, a third column can include a record type, a fourth column can include a name or title of the record and a fifth column can include the owner or creator of the record. In some alternative implementations, these or additional columns can include other information about or pertaining to the records.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some such implementations, each row of the Record-User Table represents a subscription between a particular record and users subscribed to the record. Each row can include an OrgID in a first column, a RecordID in a second column, and at least one UserID in one or more third columns. Thus, each row defines a subscription relationship in which a user identified by a UserID in the third column is subscribed to the record identified by the RecordID in the second column, and in which the record identified by the RecordID in the second column is within the organization identified by the OrgID in the first column of the same row. In some alternative implementations, additional columns can include other information about or pertaining to the subscriptions between the users and records.

In some implementations, the database system 16 includes a "Feed Items object." The Feed items object is a data structure that can be represented or conceptualized as a "Feed Items Table" that associates users, records and groups to posts, comments, files or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

In some such implementations, each row of the Feed Items Table represents a defined relationship or link between a particular feed item and an associated user, record or group. Each row can include an OrgID in a first column, a FeedItemID in a second column, a UserID of the publishing user or owner of the feed item (for example, the user that submitted the publication associated with the feed item) in a third column, and a feed item body in a fourth column. That is, in some implementations, each row is associated with a particular feed item and the particular feed item is uniquely identified by the respective FeedItemID. The feed item body can include the content to be displayed in or with the feed item when displayed in a network feed. For example, the content in the feed item body can include the text of a publication submitted by the publishing user. The content in the feed item body also can include identifiers, links or addresses to separately stored documents, videos, images or other files or other publications to be displayed with the feed as part of the feed item. For example, in some implementations, the links to the files are displayed in the first hierarchical level of the feed item or a second hierarchical level of the feed item. In some other implementations, the files themselves (or a preview of the files) are displayed as part of the feed item.

In some implementations, other columns can include UserIDs, GroupIDs or RecordIDs of associated users, groups and records that have been @-mentioned by the publishing user as part of the publication. In some implementations, a ParentID can be specified in another column. The ParentID can include, for example, the UserID, RecordID or Group ID corresponding to the user feed, record feed or group feed where the publication was submitted. Another column can include a timestamp associated with a time the publication was submitted. Other columns can include text or links associated with feed-tracked updates to the feed item. Other columns can include the UserIDs of users that have "liked" the post, file or other publication in the feed item. Other columns can include the UserIDs of users that have shared the publication in the feed item.

Other columns of the Feed Items Table can include CommentIDs identifying comments submitted on the publication and to be subsequently included in, for example, a second hierarchical level within the associated feed item when displayed in a network feed. In some such implementations, the database system 16 includes a "Comment Items object." The Comment Items object is a data structure that can be represented or conceptualized as a "Comment Items Table" that associates comments to associated feed items to which the comments were submitted (or "published"). In some implementations, the Comment Items Table includes all of the comments made by users within the organization. In some other implementations, there can be a Comment Items Table for each division, department, team or other sub-organization within an organization. In implementations in which the organization is a tenant of a multi-tenant enterprise social network platform, the Comment Items Table can include all of the comments within all of the organizations that are tenants of the multitenant enterprise social network platform.

In some such implementations, each row of the Comment Items Table represents a defined relationship or link between a particular comment and an associated feed item to which the comment was published. Each row can include an OrgID in a first column, a CommentID in a second column, a FeedItemID in a third column, a UserID of the publishing user that submitted the comment in a fourth column, and a Comment body in a fourth column. That is, in some implementations, each row is associated with a particular comment and the particular comment is uniquely identified by the respective CommentID. The comment item body can include the content to be displayed in or with the feed item when displayed in a network feed. For example, the content in the comment item body can include the text of a comment submitted by a publishing user. The content in the feed item body also can include links or addresses to separately stored files to be included in the comment when displayed in a network feed. For example, in some implementations, the links to the files are displayed in the comment, while in some other implementations, the files themselves (or a preview of the files) are displayed as part of the comment. In some implementations, other columns can include UserIDs, GroupIDs or RecordIDs of associated users, groups and records that have been @-mentioned by the published user in the comment.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

IV. Interest Groups Based on Network Feed Items

Various implementations relate generally to creating an interest group based on a network feed item. Some implementations more specifically relate to creating an interest group based on published content in a feed item and based on interactions with the feed item by other users. As described above, when a user submits a publication to a network feed, such as a user feed, group feed or record feed, the publication is stored by the database system 16 as a feed item. The publication can include user-entered textual content, and in some implementations, an associated file. After the publication is submitted to a feed, other users subscribing or having access to that feed may share the publication, comment on the publication, like the publication, or otherwise interact with or express an interest in the publication. In various implementations, the publishing user can create a dynamic interest group (also referred to herein more simply as an "interest group") pertaining to the feed item, and more specifically, to the content of the publication for which the feed item was created. For example, in some implementations the publishing user can create the interest group by clicking or otherwise selecting a graphical UI element such as a virtual button or link displayed within or in proximity to the feed item that contains the publication.

In some implementations, the database system 16 automatically subscribes the publishing user and other interested users to the interest group. In some implementations, the database system 16 identifies the interested users by determining which users commented on the publication or on other comments within the feed item, which users liked the publication or comments within the feed item, and which users shared the feed item to other feeds associated with other users, groups or records. In some implementations, the database system 16 also identifies as interested users those users who have been referenced in the feed item or otherwise targeted to receive the corresponding publication. For example, the database system 16 can identify as interested users those users who have been @-mentioned in the publication or in submitted comments within the feed item. The publishing user and the users who shared the publication, commented on the publication, liked the publication or who were referenced in the publication all can be characterized as having an interest in the publication, and as such, also are collectively referred to herein as "interested users."

Figure 5:
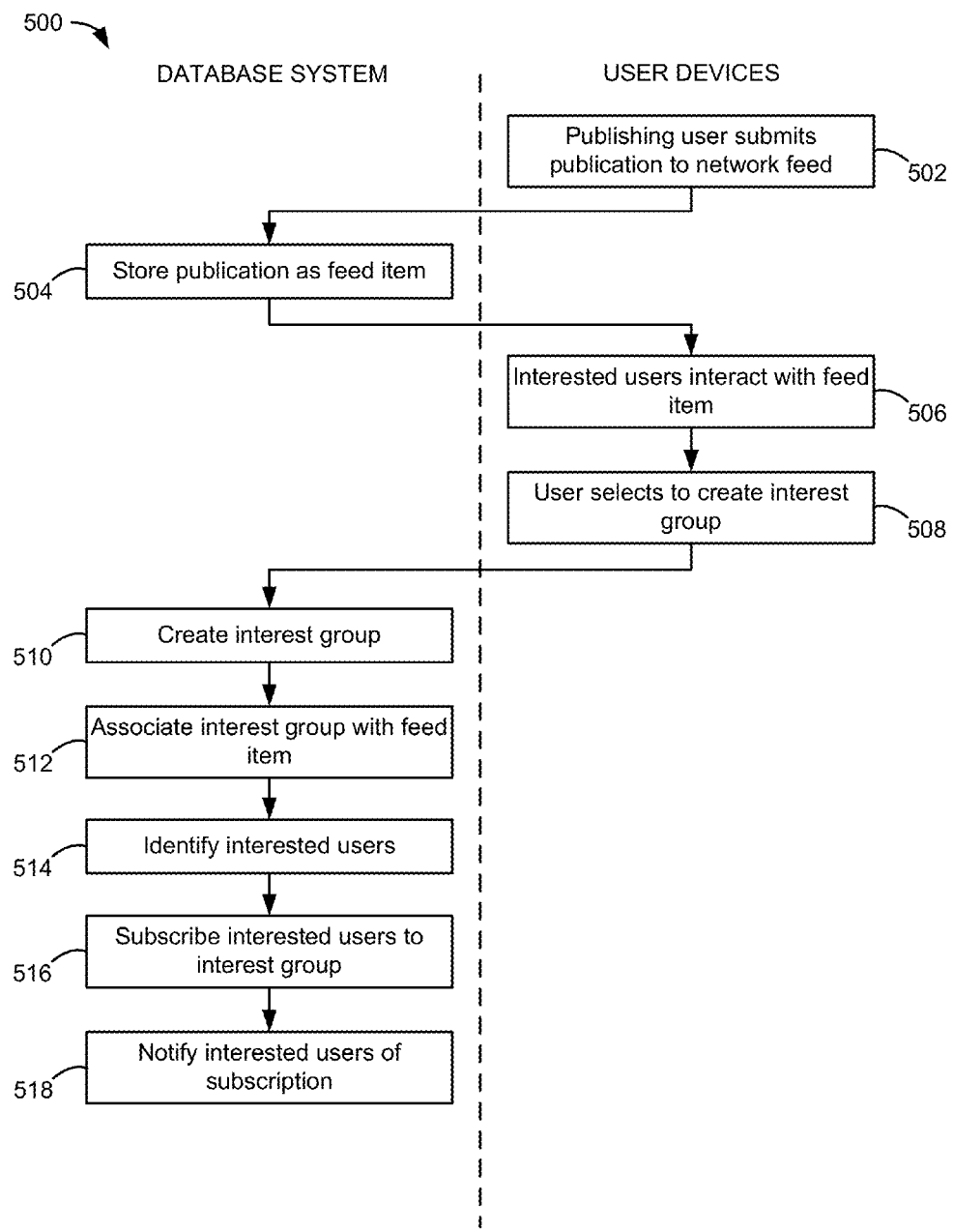
FIG. 5 shows a flow chart illustrating a process for creating an interest group according to some implementations.

FIG. 5 shows a flow chart illustrating a process 500 for creating an interest group according to some implementations. In block 502, a user submits a publication to a network feed. Generally, the publishing user can submit the publication in block 502 to any feed the publishing user has access to (for example, a user feed, a group feed, a record feed, a community feed or other type of network feed). However, the publishing user may be selective in choosing which feed or feeds to which to submit the publication. For example, the publishing user may desire to submit the publication to a feed associated with a user, group, community or record having subscribers that may be expected or hoped to have an interest in the publication.

The publishing user can submit the publication via a publication window of a network feed. For example, the publishing user can submit the publication in a publication window of a group feed or record feed, such as the publication windows 306 and 406 for the group or record feeds 304 or 404, respectively, shown and described above with reference to FIGS. 3 and 4.

Figure 6:
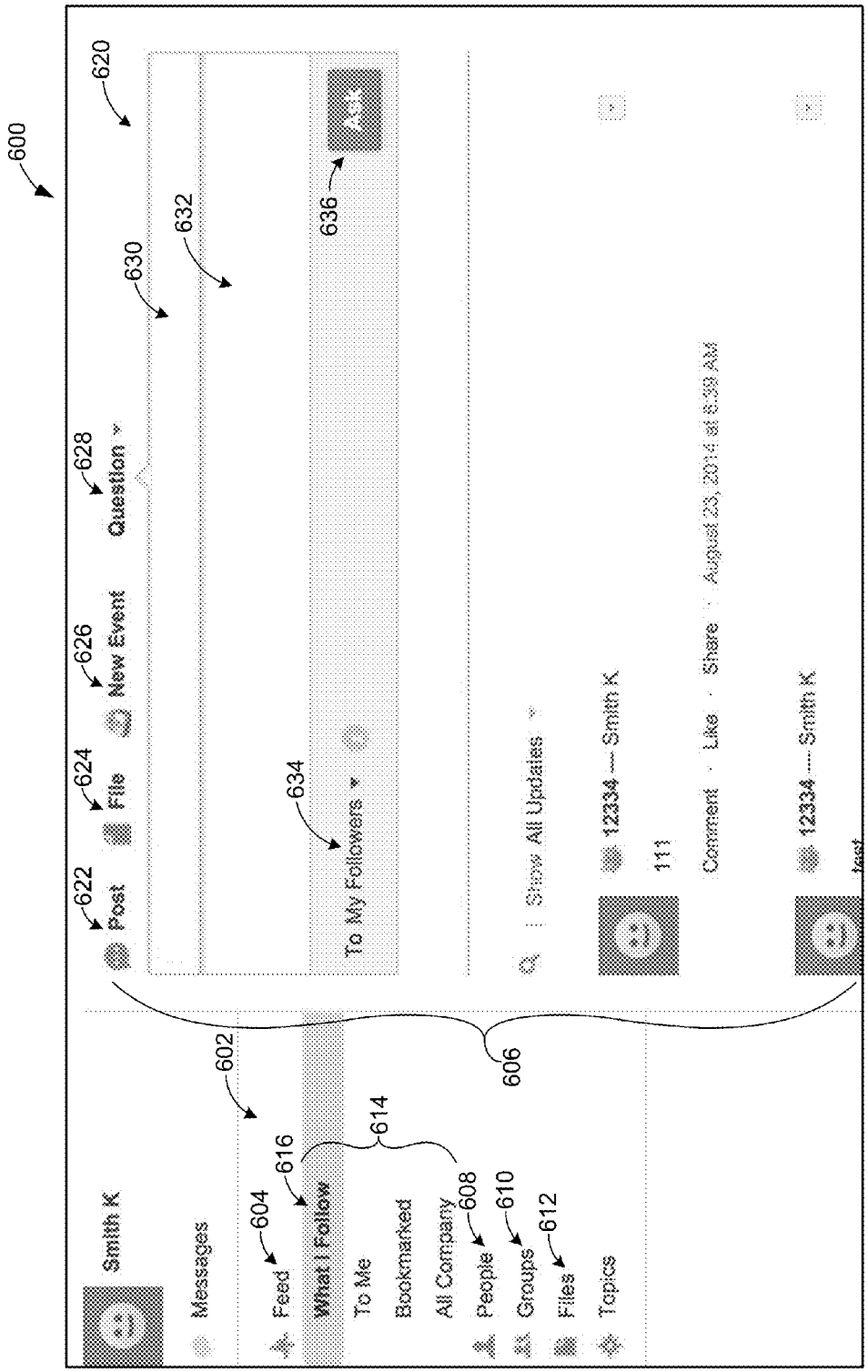
FIG. 6 shows an example of a web interface for a user page including a user feed for interacting with other users of an enterprise social network according to some implementations.

In some other implementations, the publishing user can elect to submit the publication via the publishing user's own personal user news feed. FIG. 6 shows an example of a web interface 600 for a user page including a user feed for interacting with other users of an enterprise social network according to some implementations. The interface 600 includes a section 602 in which the user can select various information to view in the interface 600. For example, the user can select a "Feed" button or tab 604 to view a user feed 606, a "People" button 608 to view other users the user follows or who follow the user, a "Groups" button 610 to view Groups the user is a member of, a "Files" button 612 to view files the user has created, edited, used or otherwise has access to. In the illustrated example, the Feed button 604 is selected resulting in the display of the user feed 606. When the Feed button 604 is selected, a picklist 614 of various filters can be displayed below the Feed button 604 enabling the user to filter the feed items to be displayed in the user feed 606. For example, the user can select a "What I Follow" filter 616 (currently selected in the illustrated example) to view feed items associated with other users, groups and records the user subscribes to. The user also can select other filters such as a "To Me" filter to view feed items shared with or otherwise targeted to the user, a "Bookmarked" filter to view feed items that the user has selected to bookmark, and an "All Company" filter to view all of the feed items for the entire organization.

The interface 600 also includes a publication window 620. As described with reference to the group and record feeds 304 and 404 shown in FIGS. 3 and 4, respectively, the publishing user ("Smith K" in the illustrated example) can select a format or context for the publication by selecting a Post sub-tab 622, a File sub-tab 624, a New Event sub-tab 626, or a Question sub-tab 628. In the example shown in FIG. 6, the publishing user has selected the Question sub-tab 628. In this example, when the Question sub-tab 628 is selected, the publication window 620 includes a subject field 630 in which the publishing user can enter a subject of the question to be published, and a body field 632 in which the publishing user can enter the question and related information. For example, the publishing user can enter information such as a problem the user is encountering, a tool in which the problem is encountered, attempts to solve the problem, and the results of such attempts. In the illustrated implementation, the publication window 620 also includes a picklist or other UI element or field 634 in which the publishing user can select the recipients of the publication. In this example, the publishing user has selected "My Followers" to distribute the question to the users that follow the publishing user. Alternatively, the publishing user can, in some implementations, use the picklist 634 to select one or more groups, records or individual users to receive the publication in the respective group feeds, record feeds or personal user feeds. As described above, the user also can publish the question (or any publication) directly on one or more group feeds, record feeds or other users' feeds by navigating to the respective feeds. The publication window 620 also includes an "Ask" button 636 that, when clicked or otherwise selected, submits the publication.

The submission of a publication (whether it is a post, a file, a new event, a link or a question) triggers the database system 16 to store the publication as a feed item in block 504. For example, the database system 16 can store the publication as a feed item in a Feed Items Table as described above. In some implementations, the database system 16 assigns the feed item a FeedItemID and stores the FeedItemID along with the content of the publication (for example, the subject and body of the question in the example of FIG. 6, the content of a post in the example of FIG. 3, or an identifier of a file and related user-entered content in the example of FIG. 4). As described above, the database system 16 also stores the UserID of the publishing user and a ParentID (for example, a UserID, GroupID or RecordID) corresponding to the respective feed to which the publication was submitted in the Feed Items Table. The database system 16 also stores the UserIDs, GroupIDs and RecordIDs of other users, groups or records @-mentioned in the publication. In some implementations, such as that described with reference to FIG. 6, the database system 16 also stores the UserIDs, GroupIDs or RecordIDs of the specified targets of the publication, for example, as determined by the selection made in the picklist 634.

Subsequently, when any subscribers of a network feed to which the feed item was published or shared access the network feed, the database system 16 includes the feed item for display in the feed. In some implementations, the database system 16 also includes the feed item in the personal news feeds of these subscribers. Additionally, when any other users specifically targeted by, for example, the selection made in the picklist 634 access their personal news feeds, the database system 16 includes the feed item in these personal news feeds. For example, in the implementation of FIG. 6, all followers of the publishing user would view the feed item in their own respective personal news feeds.

In block 506, other users viewing the feed item interact with the feed item. While described as a single block, block 506 can span virtually any duration of time (for example, seconds, minutes, hours, days, weeks, or longer). As described above, interested users may interact with and express interest in the feed item by commenting on the publication, commenting on comments already made on the publication, liking the publication or comments, or sharing the feed item. In some instances, interested users also may reference other users by @-mentioning the other users in their own comments.

Figure 7:
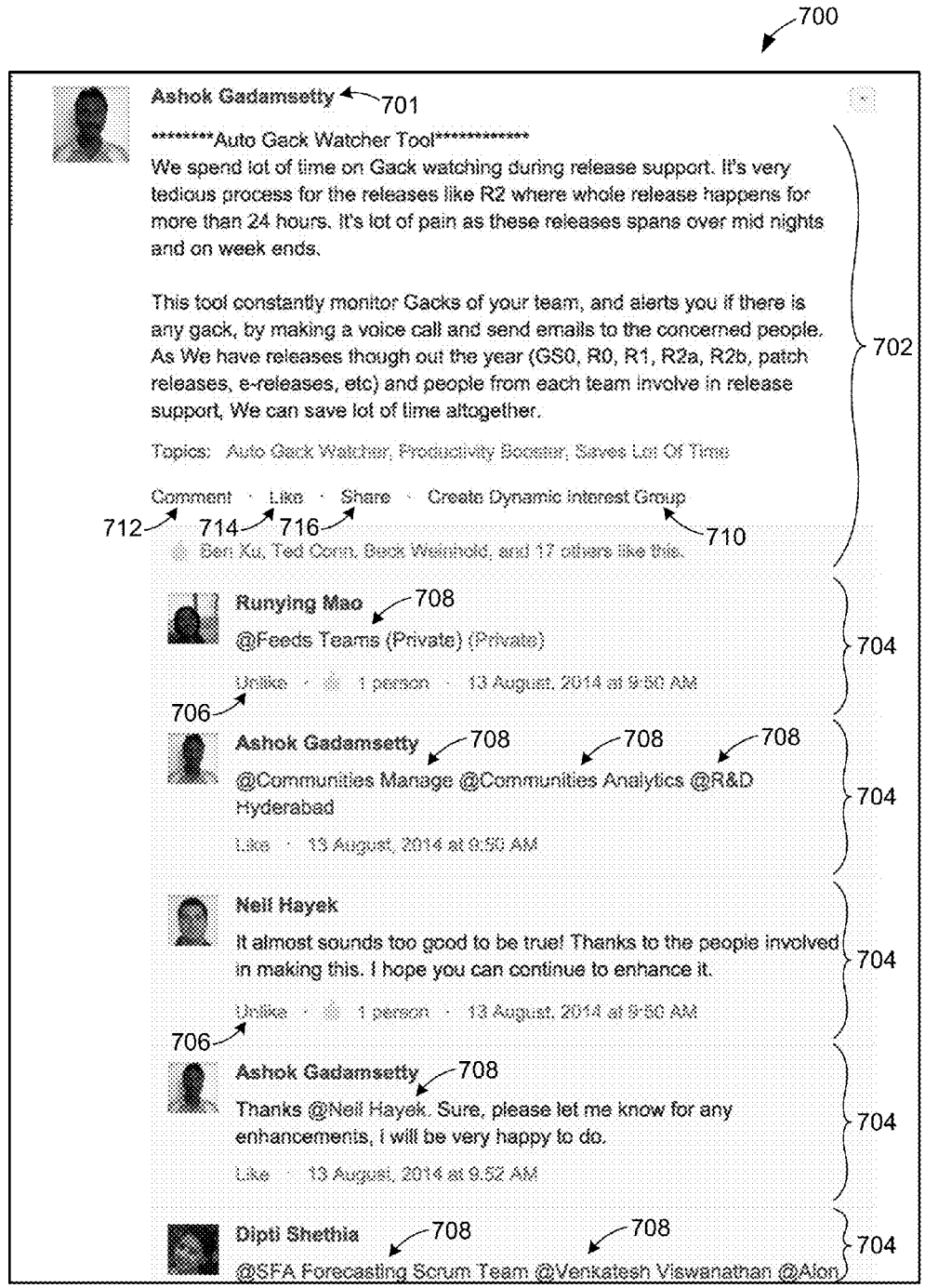
FIG. 7 shows an example feed item in an example network feed according to some implementations.

FIG. 7 shows an example feed item 700 in an example network feed according to some implementations. For example, the feed item 700 can be the feed item as it is displayed to the publishing user or to other users after multiple other interested users have interacted with the feed item in block 506. As shown, the feed item 700 includes the original publication 702 submitted by the publishing user 701. For example, in the example feed item 700 of FIG. 7, the publication 702 includes a post identifying a new tool—an "Auto Gack Watcher Tool." The publication 702 includes user-entered textual content describing a background of the motivation for the tool—the problem of labor intensive "Gack watching." The publication 702 also includes the purpose and function of the tool, and how it can facilitate a stage in a workflow associated with a product release. The feed item 700 also includes multiple comments 704 submitted by the publishing user and other interested users, likes 706 submitted by the publishing user or other interested users, and @-mentions 708 of various other users, groups and records.

As shown in the example implementation of FIG. 7, the feed item 700 also includes an additional "Create Dynamic Interest Group" button, link or other UI element 710 for creating an interest group based on the feed item. The "Create Dynamic Interest Group" button 710 can be located within or in proximity to the feed item. For example, the button 710 can be displayed below the publication 702 next to the Comment, Like and Share links 712, 714 and 716, respectively. In some implementations, the "Create Dynamic Interest Group" button 710 is visible in the feed item only when the feed item is accessed by the publishing user. In some such implementations, only the publishing user who submitted the original publication for which the feed item was created has the capability to create an interest group based on the feed item. In some other implementations, the button 710 is visible in the feed item when the feed item is accessed by the publishing user or by any other user who has interacted with the feed item, for example, by commenting, liking or sharing, or by any user who has been @-mentioned or otherwise referenced in any portion of the feed item. In some such implementations, any of these users is able to create an interest group based on the feed item. In some other implementations, the button 710 is visible to any user having access to the feed item, and any of such users can create an interest group based on the feed item.

In block 508, the publishing user (or another interested user having the capability to create an interest group) clicks or otherwise selects the "Create Dynamic Interest Group" button 710. In some instances, the publishing user or another interested user may select to create the interest group after such user determines that sufficient interest in the publication has been demonstrated; for example, after a suitable or desirable number of interested users have commented on the publication or on other comments, liked the publication or comments, or shared the feed item. In one example use case in which the publication pertains to a problem the publishing user is encountering (for example, referred to as a "gack"), the publishing user can select to create the interest group after a solution to the problem has been determined, and more specifically, after a solution has been published in a comment, after a solution has been linked, referenced or otherwise identified in a comment, after a number of unsuccessful attempts have been tried, or after another user has been identified that can solve the problem (for example, via an @-mention in a comment published to the feed item).

When trigged by the selection of the button 710 in block 508, the database system 16 creates the interest group in block 510. In some implementations, the database system 16 assigns the new interest group a unique GroupID and stores the GroupID and related information as described above in the Groups Table. In some implementations, the Groups Table can include another column that specifies a group type to distinguish among different types of groups, for example, between interest groups and normal groups. For example, the database system 16 can store the new interest group in the Groups Table as a group of type "interest," to indicate that the new interest group is an interest group. In some other implementations, the database system 16 stores data for the new interest group in a different "Interest Groups Table" separate from the normal Groups Table described above. In some such implementations, the Interest Groups Table is similar to the Groups Table described above but stores data only for interest groups. In such implementations, the interest group is assigned a unique InterestGroupID. In some implementations, the database system 16 stores the UserID of the publishing user as the owner of the interest group in the Groups Table or Interest Groups Table in which the interest group is stored. In some other implementations, the database system 16 stores the UserID of the user who created the interest group as the owner of the interest group.

In some implementations, the database system 16 stores the entire content of original publication as the name of the interest group. In some other implementations in which the publishing user specifies a subject of the publication (such as in the example user feed shown and described with reference to FIG. 6), the database system 16 can store the subject of the publication as the name of the interest group. In some other implementations, the database system 16 can identify one or more topics of the publication and store some combination of topics as the name of the interest group, for example, a unique combination of topics that distinguish the interest group from the combinations of topics associated with other interest groups. Additionally, in some implementations, the owner of the interest group can edit or refine the name after the interest group is created.

Figure 8:
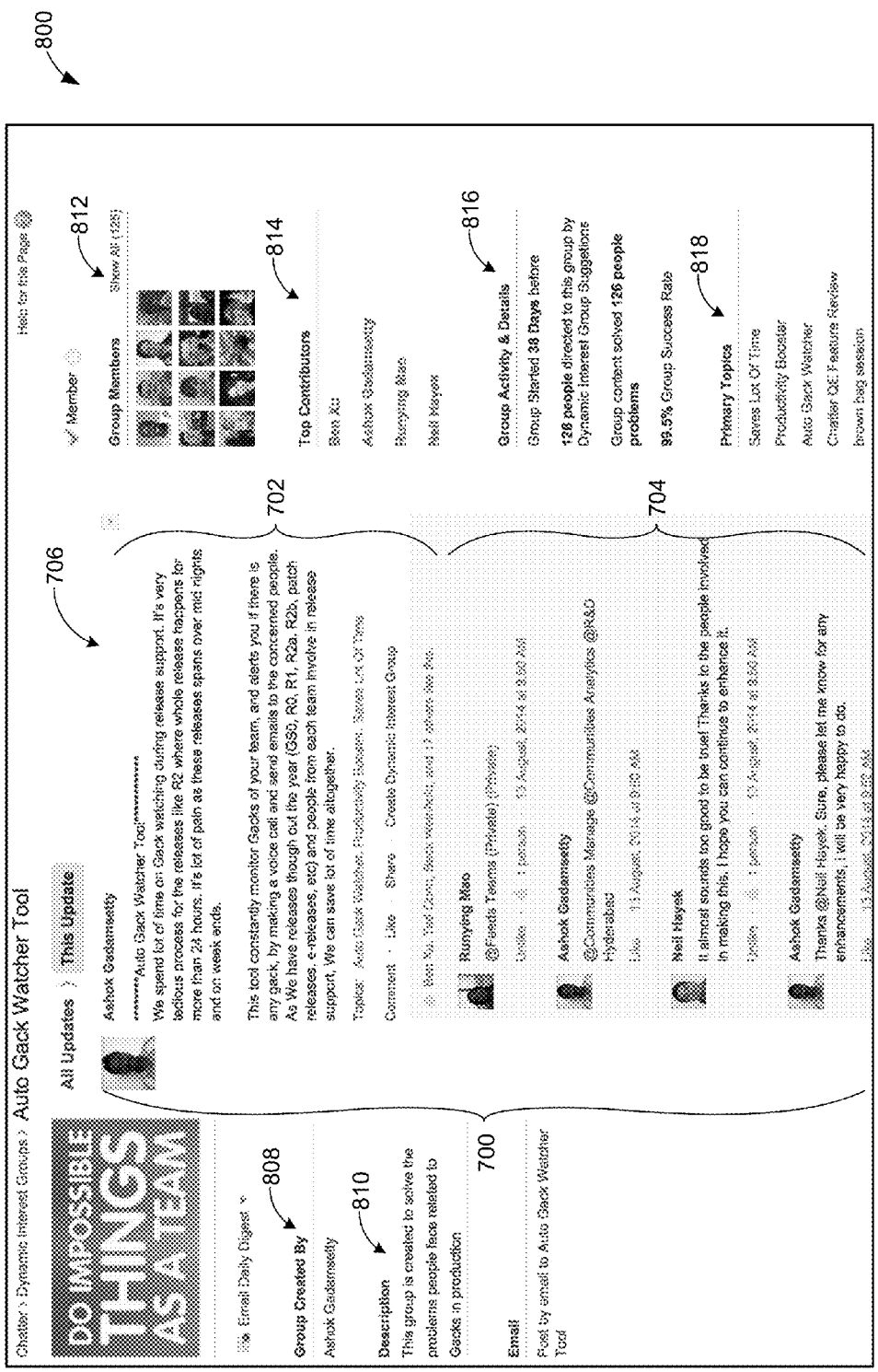
FIG. 8 shows an example of a web interface for an interest group page including a group feed for interacting with members of the interest group according to some implementations.

FIG. 8 shows an example of a web interface 800 for an interest group page including a group feed for interacting with members of the interest group according to some implementations. For example, the interface 800 displays a group page for the interest group created based on the feed item 700 of FIG. 7. In the illustrated example, the name of the interest group is "Auto Gack Watcher Tool," the name specified in the first line (or subject) of the publication 702 for which the feed item and interest group were created. As shown, the feed item 700 is included and displayed with the group feed 706 of the interest group along with the comments 704 submitted to the feed item 700. The interface 800 also shows the creator of the interest group (in this example, the publishing user) in a section 708, a short description of the interest group in a section 810, the members of the group in a section 812, the top contributors to the group feed 706 in a section 814, activity information in a section 816 and a list (in this example, in the form of hyperlinks) of topics associated with the interest group.

The database system also adds, in block 512, the GroupID or InterestGroupID assigned to the interest group to the Feed Items Table to associate the interest group to the feed item for which the interest group was created.

In block 514, the database system 16 identifies interested users to subscribe to the newly created interest group. As described above, in some implementations, the database system 16 identifies the interested users by determining which users commented on the publication or on other comments within the feed item, which users liked the publication or comments within the feed item, which users shared the feed item, and which users have been @-mentioned in the publication or in comments within the feed item. More specifically, the database system 16 can determine the interested users by accessing the feed item in the Feed Items Table and identifying the UserIDs of users who shared or liked the corresponding publication and the UserIDs of users who were @-mentioned in the publication. The database system 16 also can identify the CommentIDs of comments submitted to the feed item and subsequently access the Comment Items Table to identify the UserIDs of the users who submitted the comments as well as the UserIDs of users who liked the corresponding comments and the UserIDs of users who were @-mentioned in the comments. In some implementations, if an entire group is @-mentioned in a publication or comment, the database system 16 identifies the GroupID associated with the @-mentioned group and, using the Groups Table described above, identifies the UserIDs of the subscribers to the @-mentioned group as interested users.

In some implementations, in block 516, the database system 16 automatically subscribes the interested users identified in block 514 to the interest group. As described above, in some implementations, subscribing the interested users to the interest group in block 516 includes associating the UserIDs of the interested users to the GroupID or InterestGroupID of the interest group in the Group-User Table, or in some other implementations, to the Interest-GroupID in a separate "Interest Group-User Table" (similar to the Group-User Table described above but only including subscriptions between users and interest groups). In some implementations, the now-subscribed users are then notified in block 518 that they have been subscribed to the interest group, for example, via a daily digest or by a subscription notification in their respective personal news feed. In some implementations, the notification can provide context to the subscribed users indicating why they were subscribed to the interest group. For example, the notification can indicate to the subscribed user that he or she was subscribed based on the user's comment to the publication for which the feed item and interest group were created, based on the user's comment to a previously submitted comment to the feed item, based on the user's liking the publication or a comment within the feed item, based on the user's sharing of the publication or feed item in general, or based on being @-mentioned or otherwise referenced in the feed item.

The now-subscribed interested users will now receive the feed item and any future updates (such as additional comments) to the feed item in their respective user news feeds. Additionally, when the subscribed users view the interest group's feed, the previously submitted feed item associated with the publishing user's original publication, as well as the comments, likes or other interactions with the feed item, will be included and displayed in the interest group's feed. Furthermore, the subscribed users will now receive feed items for new publications and associated updates submitted to the interest group's feed.

In some other implementations, the database system 16 does not automatically subscribe the interested users to the interest group. For example, in some such implementations, the database system 16 provides a notification including an invitation, suggestion or recommendation to each of the identified interested users in lieu of automatically subscribing the interested users in block 516. For example, the notification can include a selectable link to accept an invitation to subscribe to the interest group or a selectable link to view the home page of the interest group where the user can then select to subscribe to the interest group.

In some implementations, a user that was automatically subscribed to the interest group in block 516 or who accepted an invitation to join the interest group can elect to unsubscribe from the interest group or elect not to receive feed items or feed item updates when the user is no longer interested in the interest group.

In some implementations, the database system 16 automatically archives or deletes interest groups after a period of inactivity with respect to the interest group. For example, the Groups Table or Interest Groups Table in which the interest group is stored can include a column that indicates a status of the group. For example, an interest group can have an active status or an archived (or inactive) status. In some implementations, the database system 16 archives the interest group after the database system 16 determines that there has been no activity with respect to the interest group (for example, no posts or comments submitted) for a predefined duration of time. For example, in some implementations the predefined duration of time can be a number of weeks, one month, two months, three months or another reasonable or appropriate duration of time. In some implementations, archived interest groups are not deleted. In some such implementations, the database system 16 continues to store the archived interest groups; however, the database system 16 does not show the archived interest groups in the list of groups shown to users subscribed to the archived interest group. In some implementations, the database system 16 unsubscribes the users subscribed to the inactive interest group when it is archived. In some other implementations, the database system 16 deletes the inactive interest group from the Groups Table or Interest Groups Table in which the interest group is stored after the database system 16 determines that there has been no activity with respect to the interest group for a predefined duration of time. In some implementations, an administrator can configure the predefined duration of time as well as configure whether the inactive interest group should be archived or deleted after the predefined duration of time has elapsed. In some other implementations, an inactive interest group can be archived after a first predefined duration of time has elapsed and deleted after a second longer predefined duration of time has elapsed.

In some implementations, the database system 16 also identifies at least one topic for each interest group. For example, the database system 16 can identify one or more topics for the interest group created in the process 500 of FIG. 5 at any suitable stage of the process 500. For example, in some implementations, the database system 16 attempts to identify topics of the publication as the publishing user is entering text in a publication window. In some such implementations, the database system can utilize various asynchronous techniques, such as JavaScript, AJAX, or other techniques to send and retrieve data to and from the user's computing device to identify topics and to suggest interest groups as described below.

In some implementations, each interest group can be associated with multiple topics, and vice versa. For example, the topics associated with the interest group can be shown in the Topics sections 818. For example, it may be desirable for the database system 16 to identify a minimum number of topics to associate with the interest group such that the interest group can be distinguished from other interest groups by a unique combination of topics. In some implementations, each topic can be identified in a Topics Table or index within the database system 16 by a unique TopicID. In some implementations, the database system 16 can associate one or more topics to an interest group by storing the TopicIDs for the topics with the interest group's InterestGroupID in the Interest Groups Table described above. In some implementations, the topics can be key words, key terms or phrases automatically identified by database system 16 from entered text, for example, using a server-side process that performs key word searching or content recognition on entered text submitted as publications or comments in feed items. In some implementations, the Topics Table can already include an index of preciously entered topics identified by the database system 16 or entered by administrators or other users of the database system. In some implementations, the names of various records or groups also can serve as topics in the Topics Table. In some implementations, the names of various tools, products, services, clients or customers as well as version numbers, or error codes also can be included as topics in the Topics Table. In some implementations, after an interest group is created, the owner of the interest group also can manually add topics to be associated with the interest group. Additionally, when comments are submitted to the feed item or when additional publications and feed items are added to the feed of the interest group, the database system 16 can search these to identify additional topics to be associated with the interest group.

Figure 9:
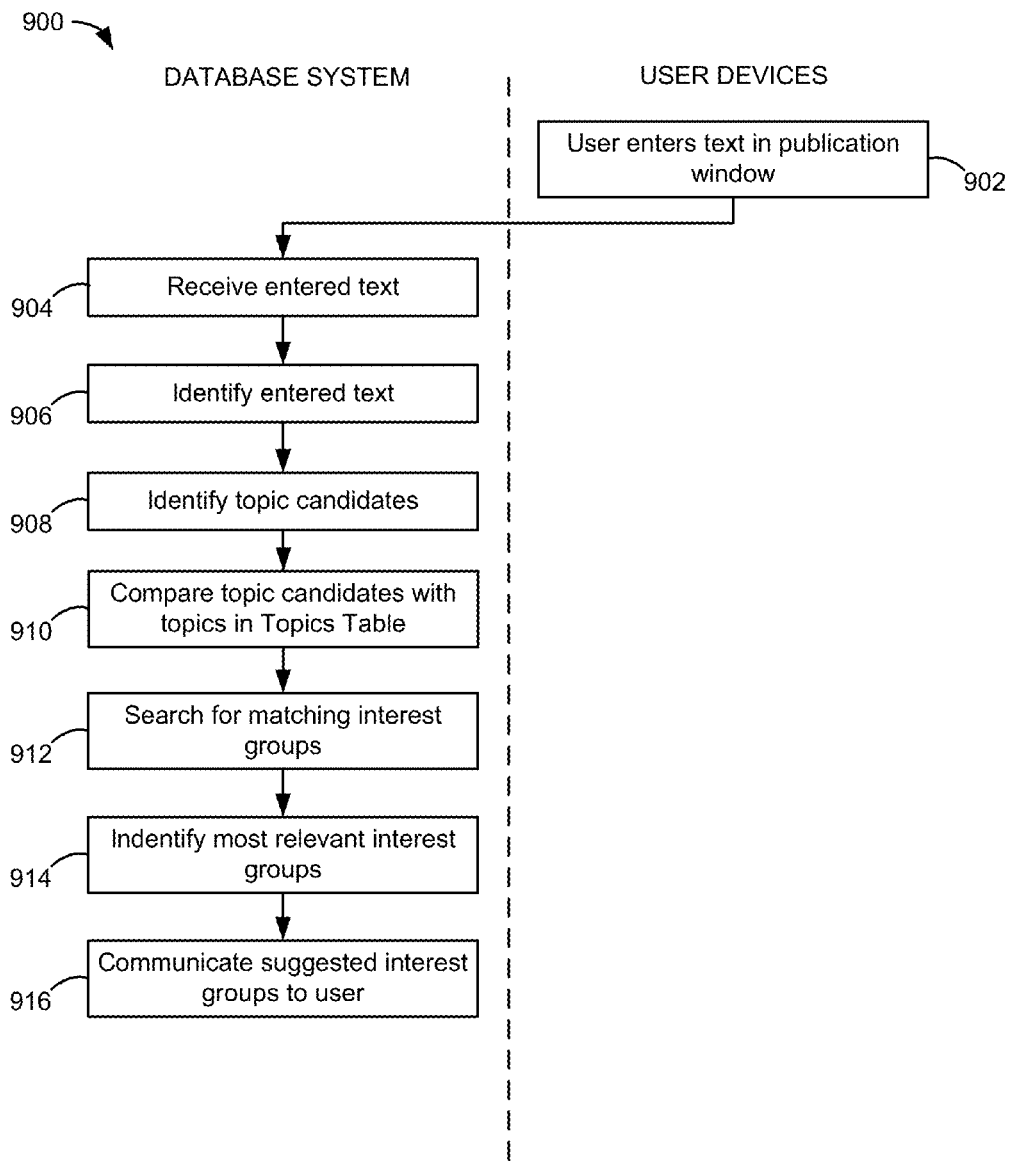
FIG. 9 shows a flow chart illustrating a process for suggesting an interest group according to some implementations.

In some implementations, a user may be entering text in a publication window to be submitted as a publication. In some implementations, as the user enters text in the publication window, the database system 16 can identify topics in the entered text, attempt to match the combination of topics to at least one previously created interest group associated with one or more of the same or similar topics, and suggest one or more of the identified interest groups to the user. FIG. 9 shows a flow chart illustrating a process 900 for suggesting an interest group according to some implementations. In some implementations, the process 900 begins in block 902 as a user enters text in a publication window. In some implementations, the entered textual characters are sent to the database system 16 asynchronously in block 902.

Figure 10:
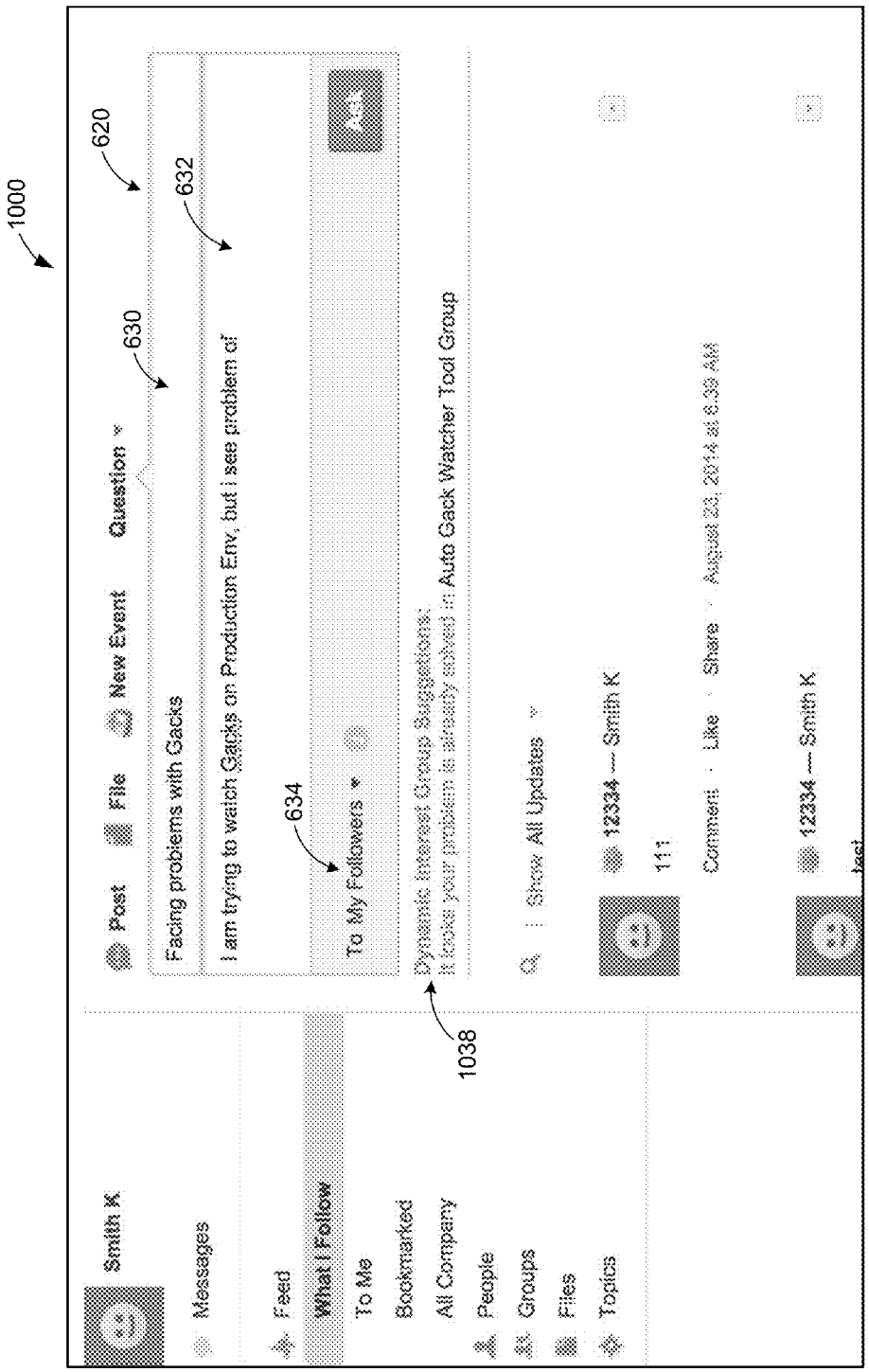
FIG. 10 shows an example of a web interface for a user page including a user feed for interacting with other users of an enterprise social network according to some implementations.

FIG. 10 shows an example of a web interface 1000 for a user page including a user feed for interacting with other users of an enterprise social network according to some implementations. In the example of FIG. 10, a user is entering text in the form of a question in a publication window 620. The publishing user has selected "My Followers" in the picklist 634. The user has entered "Facing problems with Gacks" in a subject field 630. In this example, as the publishing user is entering the text "I am trying to watch Gacks on Production Env, but I see problem of" in the body field 632, the entered textual characters are sent to the database system 16 asynchronously.

In some implementations, the database system 16 receives the entered characters asynchronously in block 904. As the database system 16 receives the textual characters, the database system 16 uses a text or other content recognition process to identify and parse, in block 906, the entered textual characters as such characters are entered, including text entered in a subject field (when present). In block 908, the database system 16 identifies topic candidates based on the text. In some implementations, the database system 16 compares the identified topic candidates with topics in the Topics Table to identify, in block 910, existing topics based on the topic candidates. The database system 16 also identifies the TopicIDs of the identified topics in block 910.

In some implementations, the database system 16 then searches the Interest Groups Table in block 912 to find Interest Groups with associated TopicIDs that match the identified TopicIDs. In block 914, the database system 16 identifies one or more of the most relevant matching dynamic interest groups based on, for example, the quality or quantity of matching topics. In some implementations, some of the topics can be weighted differently when determining the most relevant of the matching interest groups. For example, the topics in the Topics Table can be categorized into primary topics and secondary topics. In some such implementations, primary topics are weighted more heavily than secondary topics when identifying the most relevant matching interest groups. For example, primary topics can include the names of groups, records, tools, or products or topics specifically identified and added to the Topics Table by administrators or other users, while secondary topics can include topics automatically determined by the database system 16 based on content submitted in publications. For example, such secondary topics can include terms or phrases entered by users for which no other existing topics matched.

In block 916, the database system 16 communicates the suggested interest groups to the user's computing device. In some implementations, field, pop-up window or picklist is displayed within or in proximity to the publication window that includes the names of the one, two, three, four or five (or more) most relevant interest groups based on the publishing user's currently entered text. For example, referring to the interface 1000 of FIG. 10, a field titled "Dynamic Interest Group Suggestions" is displayed in a section 1038. Within the section 1038, the suggested interest group is displayed—in this example, the "Auto Gack Watcher Tool Group" shown and described with reference to FIGS. 5-8.

In some implementations, the suggested interest groups are ordered by way of descending relevancy; for example, the interest group determined to be most relevant is positioned first. In some implementations, the number of suggested interest groups displayed can vary based on a threshold relevance as determined by, for example, a minimum number of matching TopicIDs. In some implementations, an administrator can configure the threshold relevance as well as a maximum and minimum number of interest groups to be suggested to the user. In some other implementations, an administrator can configure the field 1038, pop-up window or picklist such that the a fixed number of the most relevant interest groups is displayed.

In some implementations, after one or more suggested interest groups are displayed to the publishing user, if the user continues to enter text, the database system 16 can repeat the steps of the process 900 to refine the list of suggested interest groups based on the additional entered text.

In some implementations, the suggested interested groups are displayed in the form of selectable hyperlinks. Upon selection of a hyperlinked interest group, the database system 16 can then provide the homepage or news feed of the corresponding interest group for display to the user. In this way, the user can search the interest group's homepage, and especially the news feed, for information relevant to the user's intended publication. For example, in the case in which the user is entering text about a problem the user is encountering, the user can search the interest group and corresponding feed for the solution to the problem or for ideas in solving the problem. The user also can elect to subscribe to the interest group from the group's page.

In some implementations, when a user hovers over a link to one of the suggest interest groups, for example a link in the field 1038, the database system 16 can display (for example, in a pop-up window) information about the suggested interest group, for example, an identification of the problem to which the dynamic interest group pertains, an identification of the tool in which the problem was encountered, among other potentially desirable information. In some implementations, the pop-up window or other UI element in which the interest group is displayed also can include a link or other UI element that, when clicked or otherwise selected, subscribes the user to the interest group. In some implementations, after selecting to subscribe to the dynamic interest group, the user is directed to the group's home page without additional input by the user.

In some implementations, if the user who has selected to navigate to a suggested interest group's page does not find the interest group helpful or relevant, the user can select a "back" button or other button to return to the feed and publication window in which the user was first entering text. In some such implementations, the user can select a different suggested interest group or proceed to finish and submit the publication to whatever feed the user had originally intended. In such implementations, the process 500 described above can be repeated.

Referring back to the process 500, in some other implementations, in addition to identifying interested users based on the feed item after the selection to create an interest group based on the feed item, the database system 16 also can search other group, record or user feeds associated with respective groups, records or other users to which the publishing user subscribes. The database system 16 also can determine whether the publishing user also submitted a publication pertaining to the same topics to these other feeds. When the database system determines that one or more of the other feeds also includes a publication submitted by the publishing user for the same or similar topics, the database system 16 can identify additional interested users based on the associated feed items in these other feeds, and subsequently subscribe these additional interested users to the interest group. For example, such a scenario may occur when the publishing user submits the same publication to multiple groups the user subscribes to. In such a scenario, it may be advantageous to combine the interested users identified from the various groups and subscribe them to the same interest group to facilitate collaboration.

In some other implementations, this process of finding additional feed items and associated interested users also can be extended to feed items submitted by other users different than the user who submitted the feed item from which the interest group was created.

In some implementations, in scenarios in two (or more) interest groups have been created for the same or a similar idea, such as a particular problem, the owner of either group can select to merge the two interest groups. For example, this scenario may arise when a problem to which the first interest group pertains is related to a problem to which the second interest group pertains, for example, a problem that is a subset of the problem to which the second interest group pertains, or vice versa. In some such instances, while the database system 16 may have suggested the first interest group to the publishing user associated with the second interest group, the publishing user associated with the second group may have elected to not follow the suggestion to view or subscribe to the first interest group, and instead, selected to submit a publication from which the second interest group subsequently created.

Lastly, in some implementations, when another user not subscribed to an archived interest group is in the process of entering text for a publication sharing one or more of the same topics to which the archived interest group pertains, the database system 16 can still suggest the archived interest group to the user. In some implementations, if the user selects to subscribe to the archived interest group, the database system 16 can update the status of the formerly archived interest group to active. In this way, the database system 16 does not need to create a new interest group for the same or a similar combination of topics.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. An enterprise social networking database system configurable to cause:
   providing for display in a user interface on a first device of a first user:
      a feed of the enterprise social networking database system, and
      a publication element associated with the feed, the publication element configured to receive input data for sharing in the enterprise social networking database system;
   obtaining first input data from the first device via the publication element;
   identifying a referenced user in the first input data, the referenced user being associated with an @-mention in content of the publication element;
   creating a feed item comprising the first input data;
   sharing the feed item in one or more feeds of the enterprise social networking database system;
   obtaining second input data associated with the feed item from a plurality of second devices of a plurality of second users;
   identifying one or more of the second users as having submitted in the second input data one or more of: a comment on the feed item, a like of the feed item or a request to share the feed item;
   providing for display in the user interface on the first device a user interface (UI) element associated with the feed item, the UI element being user-selectable to cause creation of a group of users of the enterprise social networking database system;

obtaining an indication from the first device that the UI element has been selected; and responsive to obtaining the indication:

generating or updating one or more group data objects in a database to:

create the group of users in association with the feed item, the creation of the group being based on satisfaction of a criterion or criteria, the criterion or criteria comprising identification of a user as capable of providing a solution, the solution being identified by the comment on the feed item, and subscribe the first user, the referenced user and the identified one or more second users to the group.

2. The system of claim 1, wherein the second input data comprises a comment regarding the feed item.

3. The system of claim 1, wherein the second input data comprises a like regarding the feed item.

4. The system of claim 1, wherein the second input data comprises a request to share the feed item.

5. The system of claim 1, wherein the database system is further configurable to cause:

determining when a third user is referenced in the first input data or in the second input data; and responsive to determining that the third user is referenced in the first input data or in the second input data, subscribing the third user to the group.

6. The system of claim 1, wherein:

the feed item is assigned a feed item identifier in a feed items table in the database.

7. The system of claim 6, wherein:

each user is assigned a user identifier in a user table in the database; and the user identifier of the first user is associated with the feed item identifier in the database.

8. The system of claim 7, wherein, responsive to obtaining the second input data, the user identifiers of the second users are associated with the feed item identifier in the database.

9. The system of claim 8, wherein, responsive to obtaining the indication, the database system is configurable to cause:

accessing the feed item table to identify the user identifiers associated with the feed item identifier, the users corresponding to the identified user identifiers comprising the first user, the referenced user, and the identified one or more second users.

10. A database-implemented method comprising:

providing for display in a user interface on a first device of a first user:

a feed of an enterprise social networking database system, and a publication element associated with the feed, the publication element configured to receive input data for sharing in the enterprise social networking database system;

obtaining first input data from the first device via the publication element;

identifying a referenced user in the first input data, the referenced user being associated with an @-mention in content of the publication element;

creating a feed item comprising the first input data;

sharing the feed item in one or more feeds of the enterprise social networking database system;

obtaining second input data associated with the feed item from a plurality of second devices of a plurality of second users;

identifying one or more of the second users as having submitted in the second input data one or more of: a comment on the feed item, a like of the feed item or a request to share the feed item;

providing for display in the user interface on the first device a user interface (UI) element associated with the feed item, the UI element being user-selectable to cause creation of a group of users of the enterprise social networking database system;

obtaining an indication from the first device that the UI element has been selected; and responsive to obtaining the indication:

generating or updating one or more group data objects in a database to:

create the group of users in association with the feed item, the creation of the group being based on satisfaction of a criterion or criteria, the criterion or criteria comprising identification of a user as capable of providing a solution, the solution being identified by the comment on the feed item, and subscribe the first user, the referenced user and the identified one or more second users to the group.

11. The method of claim 10, wherein the second input data comprises a comment regarding the feed item.

12. The method of claim 10, wherein the second input data comprises a like regarding the feed item.

13. The method of claim 10, wherein the second input data comprises a request to share the feed item.

14. The method of claim 10, further comprising:

determining when a third user is referenced in the first input data or in the second input data; and responsive to determining that the third user is referenced in the first input data or in the second input data, subscribing the third user to the group.

15. The method of claim 10, wherein:

the feed item is assigned a feed item identifier in a feed items table in the database.

16. The method of claim 15, wherein:

each user is assigned a user identifier in a user table in the database; and the user identifier of the first user is associated with the feed item identifier in the database.

17. The method of claim 16, wherein, responsive to obtaining the second input data, the user identifiers of the second users are associated with the feed item identifier in the database.

18. The method of claim 17, the method further comprising, responsive to obtaining the indication:

accessing the feed item table to identify the user identifiers associated with the feed item identifier, the users corresponding to the identified user identifiers comprising the first user, the referenced user, and the identified one or more second users.

19. One or more non-transitory computer-readable storage media storing instructions executable by one or more processors in a database system to cause operations to be performed comprising:

providing for display in a user interface on a first device of a first user:

a feed of an enterprise social networking database system, and a publication element associated with the feed, the publication element configured to receive input data for sharing in the enterprise social networking database system;

obtaining first input data from the first device via the publication element;

identifying a referenced user in the first input data, the referenced user being associated with an @-mention in content of the publication element;

creating a feed item comprising the first input data;

sharing the feed item in one or more feeds of the enterprise social networking database system;

obtaining second input data associated with the feed item from a plurality of second devices of a plurality of second users;

identifying one or more of the second users as having submitted in the second input data one or more of: a comment on the feed item, a like of the feed item or a request to share the feed item;

providing for display in the user interface on the first device a user interface (UI) element associated with the feed item, the UI element being user-selectable to cause creation of a group of users of the enterprise social networking database system;

obtaining an indication from the first device that the UI element has been selected; and responsive to obtaining the indication:

generating or updating one or more group data objects in a database to:

create the group of users in association with the feed item, the creation of the group being based on satisfaction of a criterion or criteria, the criterion or criteria comprising identification of a user as capable of providing a solution, the solution being identified by the comment on the feed item, and subscribe the first user, the referenced user and the identified one or more second users to the group.

20. The one or more non-transitory computer-readable storage media of claim 19, the operations further comprising:

determining when a third user is referenced in the first input data or in the second input data; and responsive to determining that the third user is referenced in the first input data or in the second input data, subscribing the third user to the group.

21. The one or more non-transitory computer-readable storage media of claim 19, wherein:

the feed item is assigned a feed item identifier in a feed items table in the database.

22. The one or more non-transitory computer-readable storage media of claim 21, wherein:

each user is assigned a user identifier in a user table in the database; and the user identifier of the first user is associated with the feed item identifier in the database.

23. The one or more non-transitory computer-readable storage media of claim 22, wherein, responsive to obtaining the second input data, the user identifiers of the second users are associated with the feed item identifier in the database.

* * * * *